April 11, 1950  J. W. SMITH  2,503,849
WINDOW BLIND
Filed May 8, 1946
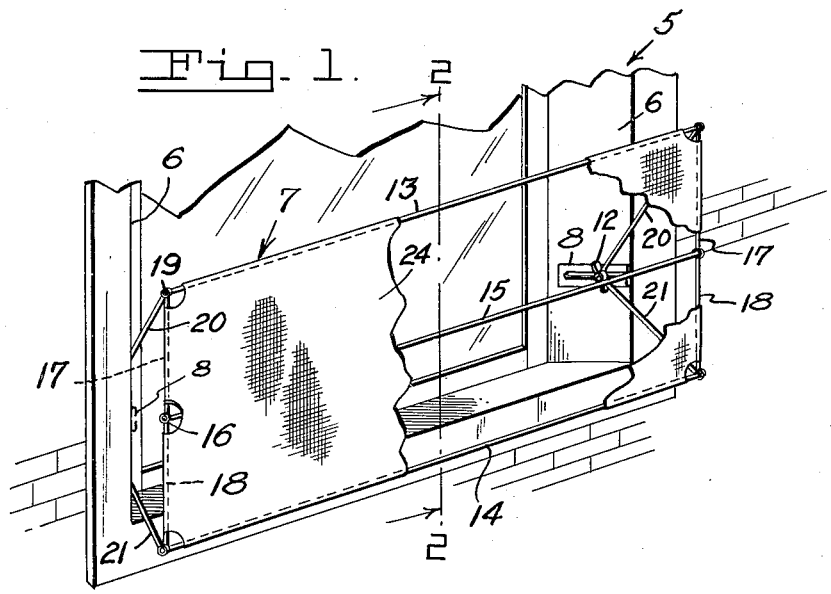
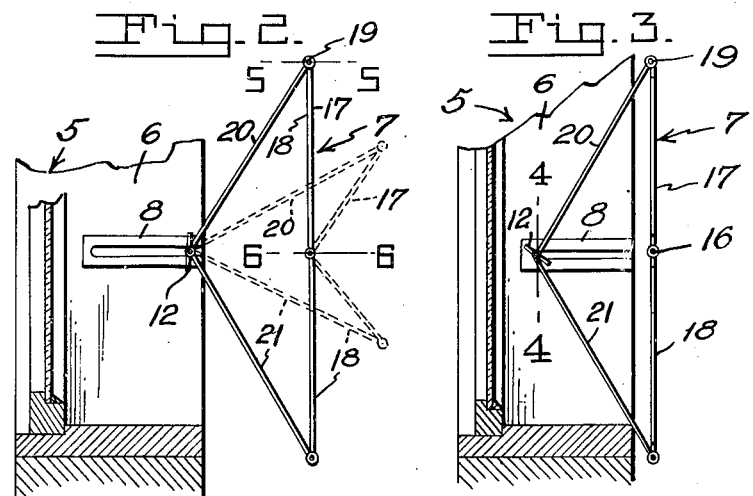
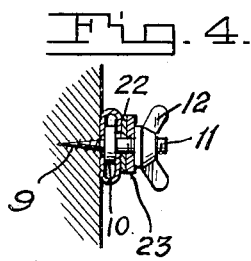
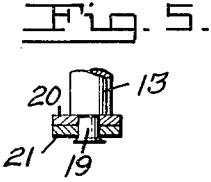
Inventor
John W. Smith
By Randolph & Beavers
Attorneys Patented Apr. 11, 1950

2,503,849

UNITED STATES PATENT OFFICE 2,503,849

WINDOW BLIND

John Wesley Smith, Newport News, Va.

Application May 8, 1946, Serial No. 668,049

2 Claims. (Cl. 160—369)

This invention relates to blinds for windows intended to bar vision by outsiders through a window, this being particularly desirable for the ground floor windows of buildings.

An important object of the invention is to provide a blind for the purpose stated which can be conveniently mounted within a window frame, or elsewhere, at the outside of a window, and preferably opposite the lower sash, constructed in such a manner as to permit adjustment to meet various requirements.

Another important object of the invention is to provide a window blind for obstructing vision through the window from the outside, wherein the parts are of simple construction, yet positive acting, foolproof and not susceptible to the ready development of defects.

Other objects and advantages of the invention will become apparent to the reader of the following description.

In the drawing:

Figure 1 is a fragmentary perspective view showing the blind positioned for use;

Figure 2 is a fragmentary vertical sectional view taken substantially on line 2—2 of Figure 1;

Figure 3 is a fragmentary vertical sectional view, similar to that of Figure 2, but showing the blind retracted;

Figure 4 is a section taken on line 4—4 of Figure 3;

Figure 5 is a section taken on line 5—5 of Figure 2;

Figure 6 is a section taken on line 6—6 of Figure 2.

Referring to the drawing, it can be seen that numeral 5 denotes a window frame including stiles 6, 6. The present invention is generally referred to by numeral 7 and includes a pair of channelled guides 8, 8 secured in opposed relation to the inner sides of the stiles 6, as in the manner substantially shown in Figures 2 and 3. These horizontally disposed guides 8 are secured in place by screws or other means 9 and each has the head 10 of a slide element 11 disposed therein, the outer end of each element 11 being threaded to accommodate a wing nut or the like 12.

The blind is composed of upper and lower rods 13, 14 and an intermediate horizontal rod 15, the ends of which are provided with reduced extensions 16 disposed into apertured eyes of upper and lower link rods 17 and 18.

The upper rod 13 also has pintle extensions 19 at the ends thereof for disposition through upper and lower arms 20, 21. The inner end of each of the arms 20, 21 is provided with an eye, these eyes being denoted by numerals 22, 23 respectively and through these opposed eyes, at each end of the blind, the corresponding slide 11 is disposed, it being also apparent that the lower arms 21 have eyes at their outer ends for receiving corresponding pins or reduced portions at the ends of the rod 14.

As is now apparent, by an observation of Figure 2, the link rods 17, 18 pivot on the ends of the rod 15 when it is desired to collapse the blind to the dotted line position, shown in Figure 2.

By loosening the wing nut 12, the blind can be pulled to the retracted position, shown in Figure 3, or extended to the position, shown in Figure 2.

By slightly loosening the wing nut 12 and pulling the rod 15 inwardly, the blind can be contracted or collapsed, as shown in dotted lines in Figure 2.

The blind can be tilted upwardly or downwardly, either in retracted or extended position. Further, the frame defined by the rods 13, 14, 17 and 18 has a filler 24 of canvas, leather or any other flexible material, which can also be metal in upper and lower sections.

The blind will effectively bar vision through the window by persons on the outside, this being especially desirable for ground floor windows.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

1. A window blind comprising an elongated substantially rectangular frame composed of vertically spaced horizontal members and horizontally spaced end members connecting the ends of the horizontal members, said end members being each constructed of a pair of pivotally connected sections, a pair of horizontal guides, one guide being located at each end of the frame, a pair of pivotal arms extending laterally from the ends of each end member, a slider in each guide, each of the arms at each end of the frame being provided at its outer end with an eye, said slider for each guide being provided with a threaded protuberance disposed through the adjacent eyes and provided with a nut adapted to clamp the eyes together and against the guide to hold the arms in predetermined disposition with respect to the corresponding guide.

2. A window blind comprising an elongated substantially rectangular frame composed of vertically spaced horizontal members and horizontally spaced end members connecting the ends of the horizontal members, said end members being each constructed of a pair of pivotally connected sections, a pair of horizontal guides, one guide being located at each end of the frame, a pair of pivotal arms extending laterally from the ends of each end member, a slider in each guide, each of the arms at each end of the frame being provided at its outer end with an eye, said slider for each guide being provided with a threaded protuberance disposed through the adjacent eyes and provided with a nut adapted to clamp the eyes together and against the guide to hold the arms in predetermined disposition with respect to the corresponding guide, the pivotal connections between the sections of each end member being defined by the provision of interlapping eyes on the sections and a longitudinal rod extending along the frame and having its ends serving as pivot points for said eyes of the end sections, said frame being provided with a flexible filler.

JOHN WESLEY SMITH.

REFERENCES CITED

The following references are of record in the file of this patent:

UNITED STATES PATENTS

| Number | Name | Date |
| --- | --- | --- |
| 422,585 | Fredrickson | Mar. 4, 1890 |
| 846,722 | Berry | Mar. 12, 1907 |
| 1,722,663 | Fox | July 30, 1929 |
| 1,825,538 | Pace | Sept. 29, 1931 |
| 1,939,294 | Dixson | Dec. 12, 1933 |
| 2,063,546 | Friedholdt, Jr. | Dec. 8, 1936 |
| 2,109,545 | McGrane | Mar. 1, 1938 |